(12) United States Patent
Biskeborn et al.

(10) Patent No.: US 10,902,867 B1
(45) Date of Patent: Jan. 26, 2021

(54) INTERCONNECT DIE FOR MULTICHANNEL TAPE HEAD ASSEMBLY

(71) Applicant: International Business Machines Corporation, Armonk, NY (US)

(72) Inventors: Robert Biskeborn, Hollister, CA (US); Calvin Shyhjong Lo, Saratoga, CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 16/733,991

(22) Filed: Jan. 3, 2020

(51) Int. Cl.
  *H05K 1/02* (2006.01)
  *G11B 5/187* (2006.01)
  *G11B 5/008* (2006.01)

(52) U.S. Cl.
  CPC .......... *G11B 5/187* (2013.01); *G11B 5/00813* (2013.01)

(58) Field of Classification Search
  CPC ....... H05K 1/02; G11B 5/187; G11B 5/00813
  USPC ......................................................... 174/250
  See application file for complete search history.

(56) References Cited

U.S. PATENT DOCUMENTS

| | | | |
|---|---|---|---|
| 7,898,074 B2 | 3/2011 | Eckhardt | |
| 8,184,394 B2 | 5/2012 | Poorman | |
| 8,730,615 B1 | 5/2014 | Poorman | |
| 9,681,542 B2 | 6/2017 | Ziegler | |
| 2005/0156297 A1 | 7/2005 | Farnworth | |
| 2009/0206458 A1* | 8/2009 | Andrews, Jr. | ......... H01L 25/105 257/676 |

FOREIGN PATENT DOCUMENTS

WO      02072181 W      1/2002

OTHER PUBLICATIONS

Biskeborn et al., "Tape Head Technology", 2012 Information Storage Industry Consortium, 2.4, <http://www.insic.org/news/2012Roadmap/PDF/24_Roadmap%20-%20Heads%20-%20FormattedV5.0.pdf>, pp. 107-128.

* cited by examiner

*Primary Examiner* — Tremesha S Willis
(74) *Attorney, Agent, or Firm* — Alexander G. Jochym

(57) ABSTRACT

An approach to forming an electronic device assembly that includes a plurality of interconnect pads on an electronic device, an interconnect die with a first set of interconnect pads adjacent to a first edge of the interconnect die connecting to a second set of interconnect pads adjacent to a second edge of the interconnect die, where a first set of connections between the plurality of interconnects on the electronic device and the first set of interconnect pads on the interconnect die occurs. Furthermore, the electronic assembly includes a second set of connections between the second set of interconnects on the interconnect die and a set of interconnect pads on a flex cable.

9 Claims, 8 Drawing Sheets

US 10,902,867 B1

INTERCONNECT DIE FOR MULTICHANNEL TAPE HEAD ASSEMBLY

BACKGROUND OF THE INVENTION

The present invention relates generally to the field of storage device technology in computer systems, and more particularly to multichannel tape recording head device assemblies for tape drives.

Computer systems rely heavily on the use of data storage technology, such as, tape drives using magnetic tape for data storage. Typically, tape recording heads used for recording data in tape drives are comprised of thin film read and write transducers fabricated on hard ceramic wafers, usually aluminum oxide or aluminum oxide with titanium carbide. As computer systems and tape recording heads used in recording of data on magnetic tapes increase in complexity, the number of channels in the tape recording heads increases. As an increasing number of channels are available in multichannel tape recording heads, an increase the number of interconnects occurs from the tape recording heads to flex cables that connect to other electronic devices in a tape drive. In many typical applications, the interconnects on a tape recording head module are connected by wirebonds to a flex cable that connects to a computer storage system.

SUMMARY

A first electronic device assembly that includes a plurality of interconnect pads on an electronic device an interconnect die with a first set of interconnect pads adjacent to a first edge of the interconnect die connecting to a second set of interconnect pads adjacent to a second edge of the interconnect die, where a first set of connections between the plurality of interconnects on the electronic device and the first set of interconnect pads on the interconnect die occurs. Furthermore, the first electronic assembly includes a second set of connections between the second set of interconnects on the interconnect die and a set of interconnect pads on a flex cable.

DETAILED DESCRIPTION

Figure 1:
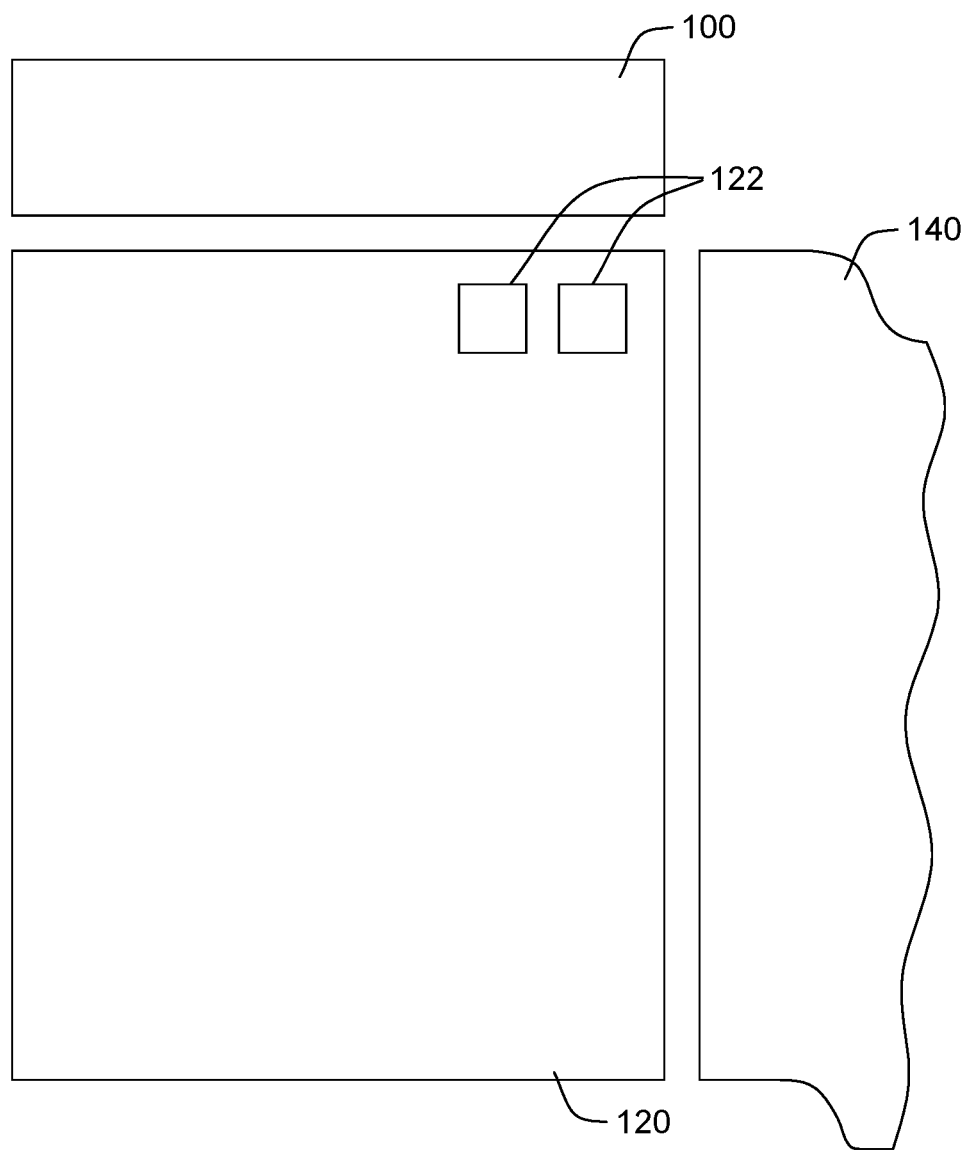
FIG. 1 depicts an illustration of a first electronic device assembly including the first electronic device, an interconnect die with a plurality of semiconductor devices, and a portion of a flex cable without interconnects between the electronic device, the interconnect die, and flex cable, in accordance with an embodiment of the present invention.

Embodiments of the present invention recognize increasing number of channels in multichannel tape recording head modules drives an increasing number of interconnections to a flex cable in tape drives for storage devices. Embodiments of the present invention recognize that processes and materials used in creating a multichannel tape recording head module provide finer lines, finer spaces, and more dense interconnect pads on the multichannel tape recording head module than is possible with flex cable technology. Embodiments of the present invention recognize that a method to escape an increasing number of interconnects on multichannel tape recording head modules to flex cables is needed. Additionally, embodiments of the present invention recognize that as the number of channels increase in the tape recording head module and the processing power of storage devices increase, an ability to provide more semiconductor devices with additional processing and/or functions is desired.

Embodiments of the present invention provide a method to escape an increasing number of interconnections from the multichannel tape recording head module as the number of channels in the multichannel tape recording head module increases by providing an interposer. The interposer is an interconnect die capable of providing circuitization with finer lines and smaller spaces for more densely packed interconnections than flex cable technology provides. Embodiments of the present invention provide an interposer that can be an interconnect die formed from a material, such as, a semiconductor material. The interconnect die is capable of providing a similar or a same line width, line spacing and pad spacing as the multichannel tape recording head module uses. Embodiments of the present invention provide an interconnect die that provides the same interconnect pad pitch as the multichannel tape recording head module interconnect pad pitch. Additionally, embodiments of the present invention provide an interconnect die that can also redistribute more dense interconnections from the multichannel tape recording head module with tighter spacing to one or more flex cables providing a less dense interconnection spacing.

Embodiments of the present invention provide interconnections from the multichannel tape recording head module to the interconnection die that are one of a wirebond interconnection, a solder interconnection, or an anisotrophic conductive film interconnect. Embodiments of the present invention provide interconnections from the interconnection die to one or more flex cables that are one of a wirebond connection, a solder connection, a conductive adhesive, or an anisotrophic conductive film connection. Embodiments of the present invention provide a set of interconnections on the interconnect die that are a same type of interconnect (e.g., all the interconnects on the interconnect die are wirebonds) or a set of interconnects that are different types of interconnects (e.g., solder connections to the multichannel tape recording head and wirebonds to a flex cable).

Embodiments of the present invention provide an interconnect die as an interposer that includes one or more passive or active semiconductor devices within the interconnect die. Embodiments of the present invention provide an interposer or interconnect die that uses through silicon vias to escape interconnections from the multichannel tape recording head module using both sides of the interconnect die. Using through silicon vias in the interconnect die, a portion of the interconnections to the interconnect die escape to interconnections on a backside of the interconnect die. Embodiments of the present invention provide interconnections to one or more flex cables on both the backside of the interconnect die and on the topside of the interconnect die.

Detailed embodiments of the claimed structures and methods are disclosed herein. The method steps described below do not form a complete process flow for manufacturing integrated circuits, such as, magnetic tape heads for tape drives. The present embodiments can be practiced in conjunction with the tape head assembly processes and techniques currently used in the art, for magnetic tape heads and tape drives, and only so much of the commonly practiced process steps are included as are necessary for an understanding of the described embodiments. The figures represent cross-section portions of tape head assemblies after fabrication and are not drawn to scale, but instead are drawn to illustrate the features of the described embodiments. Specific structural and functional details disclosed herein are not to be interpreted as limiting, but merely as a representative basis for teaching one skilled in the art to variously employ the methods and structures of the present disclosure. In the description, details of well-known features and techniques may be omitted to avoid unnecessarily obscuring the presented embodiments.

References in the specification to "one embodiment", "other embodiment", "another embodiment", "an embodiment", etc., indicate that the embodiment described may include a particular feature, structure or characteristic, but every embodiment may not necessarily include the particular feature, structure or characteristic. Moreover, such phrases are not necessarily referring to the same embodiment. Further, when a particular feature, structure, or characteristic is described in connection with an embodiment, it is understood that it is within the knowledge of one skilled in the art to affect such feature, structure or characteristic in connection with other embodiments whether or not explicitly described.

For purposes of the description hereinafter, the terms "upper", "lower", "right", "left", "vertical", "horizontal", "top", "bottom", and derivatives thereof shall relate to the disclosed structures and methods, as oriented in the drawing figures. The terms "overlying", "atop", "over", "on", "positioned on" or "positioned atop" mean that a first element is present on a second element wherein intervening elements, such as an interface structure, may be present between the first element and the second element. The term "direct contact" means that a first element and a second element are connected without any intermediary conducting, insulating or semiconductor layers at the interface of the two elements.

In the interest of not obscuring the presentation of the embodiments of the present invention, in the following detailed description, some of the processing steps or operations that are known in the art may have been combined together for presentation and for illustration purposes and in some instances may not have been described in detail. In other instances, some processing steps or operations that are known may not be described. It should be understood that the following description is rather focused on the distinctive features or elements of the various embodiments of the present invention.

FIG. 1 depicts a top view of the first electronic device assembly including the electronic device, interconnect die 120 with semiconductor devices 122, and a portion of flex cable 140, in accordance with an embodiment of the present invention. In some embodiments, the electronic device is a semiconductor device. For example, the electronic device is a semiconductor device that is one of a photonic device, a light emitting diode device, a memory chip, a logic or processor chip, such as metal-oxide semiconductor field effect transistor (MOSFET), but, is not limited to these types of semiconductor devices. In these embodiments, the electronic device can be composed of semiconductor materials used in semiconductor device manufacture. For example, a semiconductor substrate, such as, silicon, silicon germanium, any class III, IV, V, VI, or combination of these classes of semiconductor materials are used to form semiconductor devices, such as transistors, finFETs and the like using known semiconductor processes (e.g., deposition, etch, and doping processes including atomic layer deposition, reactive ion etch, etc.). While the discussion of FIGS. 1-4 identifies the electronic device as tape head 100 (i.e., as a tape head device for a tape drive), embodiments of the present invention are not limited to using the electronic device as a tape head device in a tape head assembly. The electronic device assembly depicted in FIGS. 1-8 can be used in other electronic equipment including cameras, displays, automotive applications, and the like.

In various embodiments, the electronic device is identified as a multichannel tape recording head module. The electronic device, in these embodiments, is a multichannel tape recording head module as discussed with respect to FIGS. 1-8, hereinafter, will be called a "tape head" or specifically, identified as tape head 100 in FIGS. 1-4, and tape head 500 in FIG. 5A and tape head 500C in FIGS. 5C and 5D. For example, tape head 100 can be a 64 or 128 channel tape head recording module. Tape head 100 can be composed of a plurality layers of materials, such as, magnetic materials commonly used in tape head manufacture deposited on a ceramic wafer. In various embodiments, the first electronic device assembly is a multichannel tape recording head module assembly and herein after will be called a "tape head assembly."

As depicted, FIG. 1 includes tape head 100, interconnect die 120 with semiconductor devices 122, and the portion of flex cable 140. FIG. 1 does not depict circuit features, such as lines and interconnect pads on flex cable 140 and on interconnect die 120, connections between tape head 100 and interconnect die 120, and connections between interconnect die 120 and flex cable 140 which will be discussed later in detail with respect to FIG. 2. Interconnect die 120 is an interposer to connect tape head 100 to flex cable 140. Interconnect die 120 can translate tighter pitch interconnect pads and connections (e.g., wirebonds) to tape head 100 to less dense pitch interconnect pads provided on flex cable 140.

In various embodiments, interconnect die 120 includes semiconductor devices 122. Semiconductor devices 122 can be one or more passive semiconductor devices, one or more active semiconductor devices, or a combination of both active and passive semiconductor devices. For example, semiconductor devices 122 may be an array of protection diodes, one or more field-effect transistor (FET) devices, or light emitting diodes (LEDs) created using standard semiconductor manufacturing processes. In another example, semiconductor devices 122 may be one or more of resistive arrays, a reader preamplifier, or a write driver for use in the storage device or system.

Figure 2:
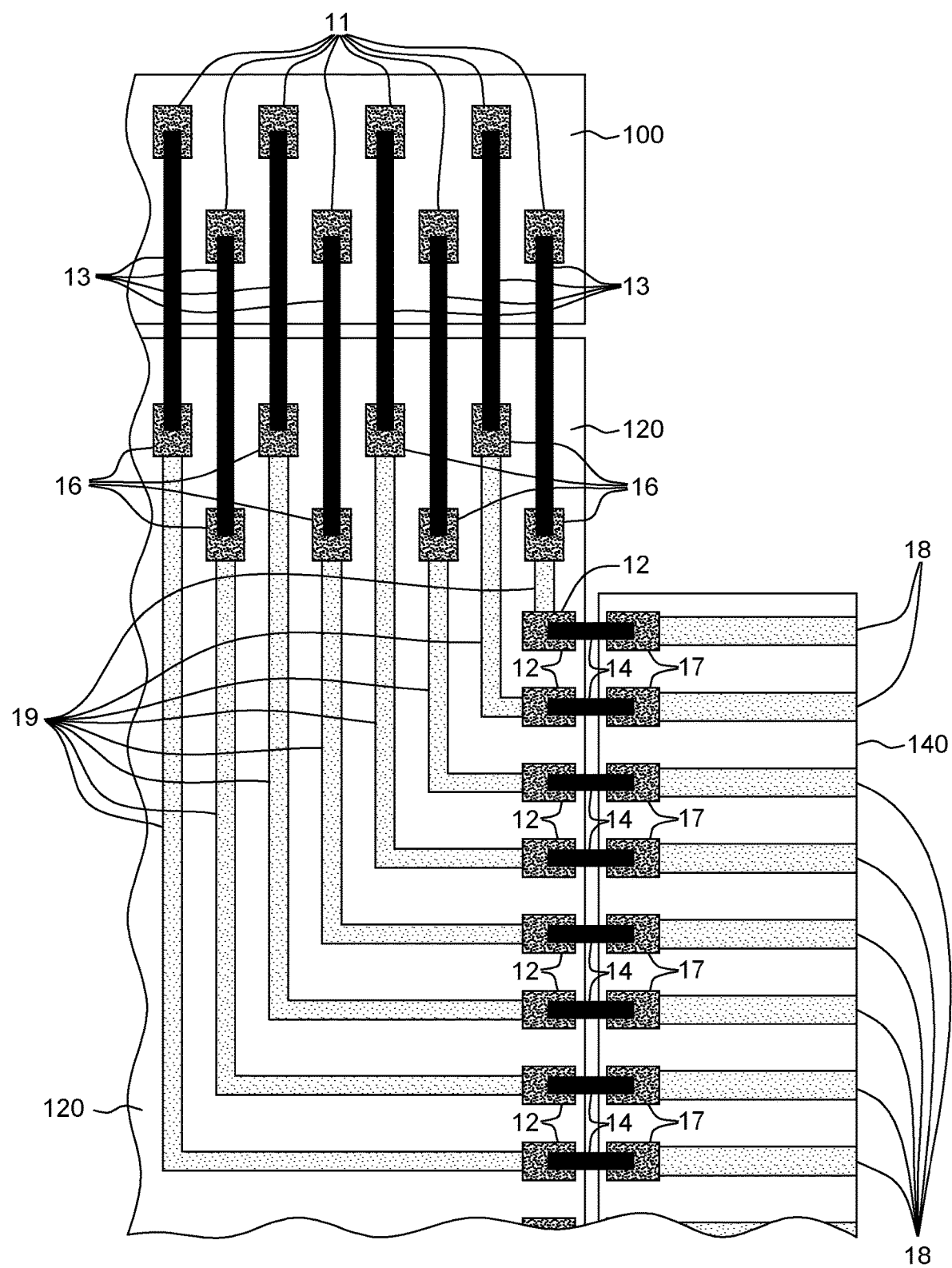
FIG. 2 depicts top view of a portion of the first electronic device assembly with a portion of the electronic device connecting to a top portion of the interconnection die and a right portion of the interconnect die connecting to a portion of the flex cable, in accordance with an embodiment of the present invention.

FIG. 2 depicts the top view of the portion of a first tape head assembly (previously identified as the first electronic device assembly in the brief description of the drawings) with a portion of tape head 100 connecting to the top portion of interconnection die 120 and a right portion of interconnect die 120 connecting to a portion of flex cable 140, in accordance with an embodiment of the present invention. As depicted, FIG. 2 includes tape head 100, interconnect pads 11, interconnect die 120, wirebonds 13 connecting interconnect pads 11 to interconnect pads 16, lines 19, interconnect pads 12, interconnect pads 17, wirebonds 14, flex cable 140, and lines 18.

In various embodiments, a size and pad metallurgy of each of interconnect pads 11, 12, 16 and 17 are consistent with wirebonding. For example, interconnect pads 11, 12, 16, and 17 may be 65 um by 100 um with a surface metallization, such as, gold, but can be a size or composed of any metal commonly used for wirebonding in tape head assembly processes. For example, interconnect pads 11 on tape head 100 and interconnect pads 16 on interconnect die 120 are 65 um wide gold pads with a length of 100 um on a 125 um in row pitch for two staggered rows of gold interconnect pads 11 on tape head 100. In this case, interconnect pads 11 and interconnect pads 16 would have an effective pitch of 62.5 um (e.g., 125 um divided by 2 when two rows with a 125 um pitch are staggered). In some embodiments, interconnect pads 11 on tape head 100 and interconnect pads 16 on interconnect die 120 are in a single row of pads with a 95 um pitch. In various embodiments, interconnect pads 11 and interconnect pads 16 may be spaced at any pitch with any wirebond pad size and shape in one or more rows that can be wirebond attached with available wirebond equipment for semiconductor die assembly or for storage drive assembly processes (i.e., for tape drive assembly).

Processes used in tape head 100 manufacturing can be capable of producing finer lines and spaces than processes in flex cable manufacturing processes. When the number lines, a pitch of lines, and/or a pitch of interconnect pads on flex cable 140 is insufficient to provide enough connections to tape head 100 with a large number of channels, interconnect die 120 can act as an interposer. Interposer die 120 can provide denser connections to tape head 100 with tighter pitches (e.g., smaller interconnect pads/spaces) that can be translated to a larger pitch for connections to less dense interconnect pads, such as, interconnect pads 17 on flex cable 140. Interconnect die 120 can be formed using semiconductor processing and materials capable of providing the same geometries for lines, spaces, and interconnect pads 16 as tape head 100 manufacturing processes can for interconnect pads 11 (e.g., interconnect pads 11 and 16 can be a same or similar size and shape). For example, tape head 100 can have 64 channels to connect, where each channel generates at least two connections per channel (e.g., at least 128 interconnections or wirebonds for 64 channels). When tape head 100 escapes 128 channels, at least 256 interconnections or 256 wirebonds 13 from tape head 100 can be created.

In conventional wirebond manufacturing processes for tape head assemblies, a flex cable, such as flex cable 140 will commonly have the same wirebond pad pitch as the pitch of interconnect pads 11 on tape head 100. However, flex cable manufacturing processes may be limited to providing a wirebond pitch in the range of 85 to 95 urn with a size of interconnect pads 17 in a range of 65 urn due, in part, to flex cable process limitations for lines and spacing. As the number of channels in tape head 100 increases from 64 channels to 128 or more channels, an ability to effectively escape the increasing number of interconnect pads 11 on tape head 100 to flex cable 140 becomes problematic (e.g., may require large, finer line flex cables and finer pitch wirebonds driving higher costs/lower yields). For at least this reason, using interconnect die 120, manufactured with semiconductor materials and processes, provides an interposer capable of providing a same wirebond pitch or interconnect pitch for any type of connection (e.g., wirebond, solder, etc.) from tape head 100 to interconnect die 120. Interconnect die 120 can re-distribute the connections from tape head 100 that may require a tighter or smaller pitch than to connections on to flex cable 140. Connections to flex cable 140 may have a larger pitch due to more limited process capabilities of flex cable technology (e.g., flex cable circuitization processes cannot provide as fine lines and spaces as tape head circuitization processes or semiconductor processes on interconnect die 120).

In various embodiments, interconnect die 120 provides interconnect pads 16 with a same wirebond pad size and a same pitch as interconnect pad 11 size and pitch. Interconnect die 120 can provide an ability to act as an interposer to re-distribute and escape connections from tape head 100 with a tighter pitch or smaller effective pitch than connections to flex cable 140 with a larger pitch. In other words, interconnect die 120 can re-distribute connections, such as wirebonds 13, with tighter pitches, using lines 19 on interconnect die 120, to connect to interconnect pads 12 on a side of interconnect die 120 so that interconnection pads 12 and interconnect pads 17 can have a larger interconnect pad pitch than interconnect pads 11 and interconnect pads 16 (e.g., wirebond 14 pitch to flex cable 140 may be larger than wirebond 13 pitch from tape head 100). Interconnect pads 17 on flex cable 140 may require a larger wirebond or connection pitch because one or more of a larger interconnect pad size, a larger interconnect a pad pitch, a larger line size, and larger line spaces on flex cable 140. As previously discussed, manufacturing processes for flex cables may not provide circuit elements, such as interconnect pads 17, that are as small or dense as pads and spaces formed on tape head 100.

As tape head channels continue to increase, an addition of interposer die 120, as depicted in FIG. 2, may provide an ability to escape more channels and more connections from tape head 100 to flex cable 140. In various embodiments, interconnect die 120 can be an interposer that can translate a tighter, denser connections with smaller pitches (e.g., smaller wirebond 13 pitch) from tape head 100 to less dense, larger connections, such as a larger wirebond 14 pitch, to flex cable 140. Additionally, in some embodiments, interconnect die 120 includes semiconductor devices 122 providing additional semiconductor functions to tape head 100 and/or to the tape drive as discussed previously with respect to FIG. 1.

In various embodiments, the number of interconnect pads 11 on tape head 100 is the same number as the number of interconnect pads 16 on interconnect die 120. For example, a number of connections, such as wirebonds 13, from tape head 100 to interconnect die 120 is the same as the number connections to flex cable 140 from interconnect die 120. In some embodiments, the number of connections from tape head 100 is the same as the total number connections to one or more flex cables (not depicted in FIG. 2). Interconnect pads 11 can be parallel to and adjacent to an edge of tape head 100. Interconnect pads 16 on interconnect die 120 are adjacent to interconnect pads 11 on tape head 100. In various embodiments, interconnect pads 11, 12, and 16 are adjacent to and parallel to an edge of interconnect die 120.

In some embodiments, wirebonds 13 are a different type of a connection, such as, a solder connection, a conductive adhesive connection, or a conductive film connection. In these embodiments, interconnect pads 11, 12, 16, and 17 can have a pad size, a pad shape, a pad pitch, and pad metallurgy for interconnect pads used in one of a solder connection, a conductive adhesive, or a connection formed using an anisotrophic conductive film.

Wirebonds 14 connect interconnect die 120 to flex cable 140. Wirebonds 14 can be any standard wirebond formed by known wirebond manufacturing equipment used in semiconductor or tape drive manufacturing. In various embodiments, wirebonds 14 are staggered (e.g., connect to two staggered rows of interconnect pads 12 on interconnect die 120 to two staggered rows interconnect pads 17 on flex cable 140). In some embodiments, interconnect pads 12 and interconnect pads 17 are in a single row (i.e., single row of wirebonds 14 that are not staggered). In an embodiment, wirebonds 14 connect lines 18 to interconnect pads 12 (i.e., interconnect pads 17 are not present).

In some embodiments, wirebonds 14 are another type of interconnection. For example, wirebonds 14 can be a connection made using a conductive film with pad size, a pad shape, a pad metallurgy, and a pad pitch for interconnect pads 12 and 17 are a size, shape, and pitch that is used in a connection formed using a conductive film, such as, an anisotrophic conductive film. In other examples, wirebonds 14 are not wirebonds but, are a connection made with a conductive adhesive or a solder connection between interconnect pads 12 and interconnect pads 17 where interconnect pads 12 and 17 have a suitable size and metallurgy for conductive adhesives or soldering.

In various embodiments, interconnect die 120 provides a number of interconnect pads 16 on interconnect die 120 connected by lines 19 to the same number of interconnect pads 11 on tape head 100. In an embodiment, the pitch of wirebonds 13 and wirebonds 14 is the same. In various embodiments, a pitch between wirebonds 13 from tape head 100 to interconnect die 120 is less than a pitch between wirebonds 14 from interconnect die 120 to flex cable 140. In these cases, connecting flex cable 140 to a right side of interconnect die 120 can result in interconnect die 120 with a rectangular shape where length of interconnect die 120 (e.g., the vertical direction length) is longer than the horizontal width of interconnect die 120.

In various embodiments, flex cable 140 is a flex cable with a single metal layer capable of providing attachment of wirebonds 14 from interposer die 120 to flex cable 140. Flex cable 140 can be composed of one or more layers of polyimide, polyimide with adhesive, polyester, or polyether ether ketone with metallization (e.g., copper with gold or nickel/gold wirebond pads and lines). Flex cable 140 can be any type of flex cable technology used in tape drive manufacture. In some embodiments, flex cable 140 includes two or more metal layers.

Figure 3:
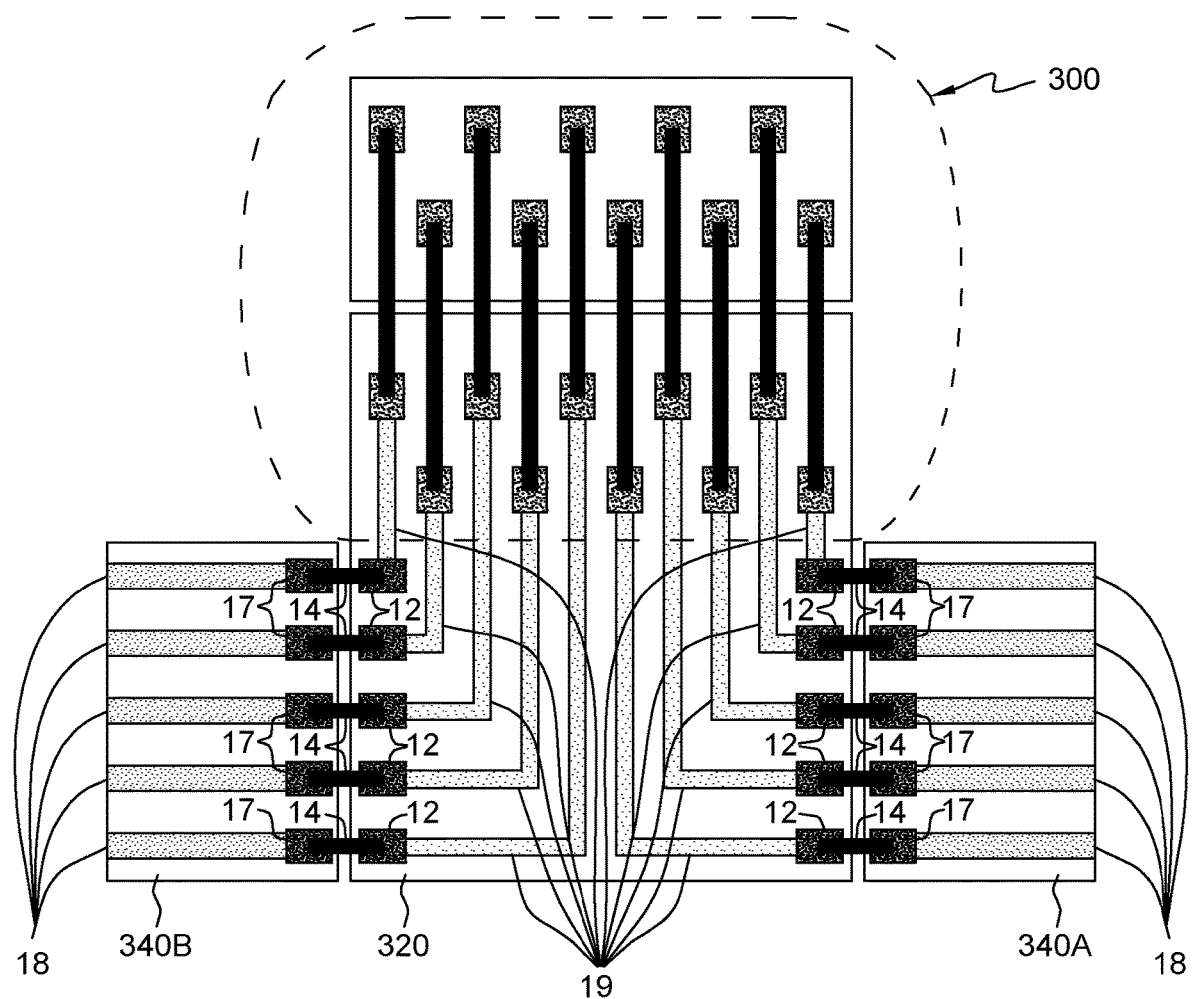
FIG. 3 depicts a top view of a second electronic device assembly with the electronic device module connecting to the top portion of the interconnect die, a right side of the interconnect die connecting to a first flex cable, and a left side of the interconnect die connecting to a second flex cable, in accordance with an embodiment of the present invention.

FIG. 3 depicts the top view of a second tape head assembly with section 300, with the right side of interconnect die 320 connecting to flex cable 340A, and with the left side of interconnect die 320 connecting to flex cable 340B, in accordance with an embodiment of the present invention. The second tape head assembly was previously identified as the second electronic device assembly in the brief description of the drawings. Section 300 depicts essentially the same elements associated with tape head 100 discussed in detail with respect to FIG. 2 (e.g., interconnect pads 11, wirebonds 13 connecting to interconnect pads 16 on interconnect die 120). The number of wirebonds 13 depicted in FIG. 3 may be less or more than the number of wirebonds 13 in FIG. 2.

As depicted, FIG. 3 includes interconnect die 320, lines 19 on interconnect die 320, interconnect pads 12, wirebonds 14, interconnect pads 17, lines 18 on flex cable 340A and on flex cable 340B, and section 300. While a number of interconnect pads depicted in section 300 (e.g., from the tape head to the interconnect die) may be less in FIG. 3 than in FIG. 2, the number of connections from the tape head, depicted in FIG. 3, is not limited to ten connections or wirebonds but, may be as many connections as needed for a multichannel tape head (e.g., 130, 260, or more connections, such as wirebonds, may be used for a multichannel tape head).

In various embodiments, interconnect die 320 has interconnect pads 12 on both the right side and the left side of interconnect die 320. While depicted as a single row of interconnect pads 12, in some embodiments, interconnect pads 12 are staggered and in two rows (e.g., similar to interconnect pads 12 depicted in FIG. 2). Each of interconnect pads 12 on the right side of interconnect die 320 can connect by wirebonds 14 to interconnect pads 17 on flex cable 340A while each of interconnect pads 12 on the left side of interconnect die 320 can connect by wirebonds 14 to interconnect pads 17 on flex cable 340B. In one embodiment, a pitch of interconnect pads 12, a pitch of interconnect pads 17, and a pitch of wirebonds 14 between interconnect die 320 and flex cable 340A and flex cable 340B is greater than to a pitch of interconnect pads 12 and 17 and the pitch of wirebonds 14 between interconnect die 120 and flex 140 in FIG. 2. In one embodiment, one or more of wirebonds 14 on the left side of interconnect die 320, wirebonds 14 on the right side of interconnect die 120, and wirebonds 13 have a connection or wirebond pitch. In various embodiments, a number of interconnect pads 12 are the same on the left and right side of interconnect die 320. In some embodiments, more interconnect pads 12 are on one of left or the right side of interconnect die 320.

Using interconnect pads 12 on both sides interconnect die 320 can provide a smaller interconnect die 320 size (e.g., a vertical length of interconnect die 320 is less as fewer interconnect pads 12 are needed on each side). Additionally, using both sides of interconnect die 320 can provide smaller flex cables with fewer connections on each of flex cable 340A and flex cable 340B. Alternatively, using both sides of interconnect die 120 for connections, such as wirebonds 14, to flex cables 340A and 340B may allow the use of less complex flex cables with larger lines and more space between lines 18 and interconnect pads 17 on flex cables 340A and 340B. Each option of a smaller interconnect die 320, smaller flex cables 340A and 340B, and less complex flex cables 340A and 340B may provide different advantages in design, cost, or space savings in the tape head assembly.

Figure 4:
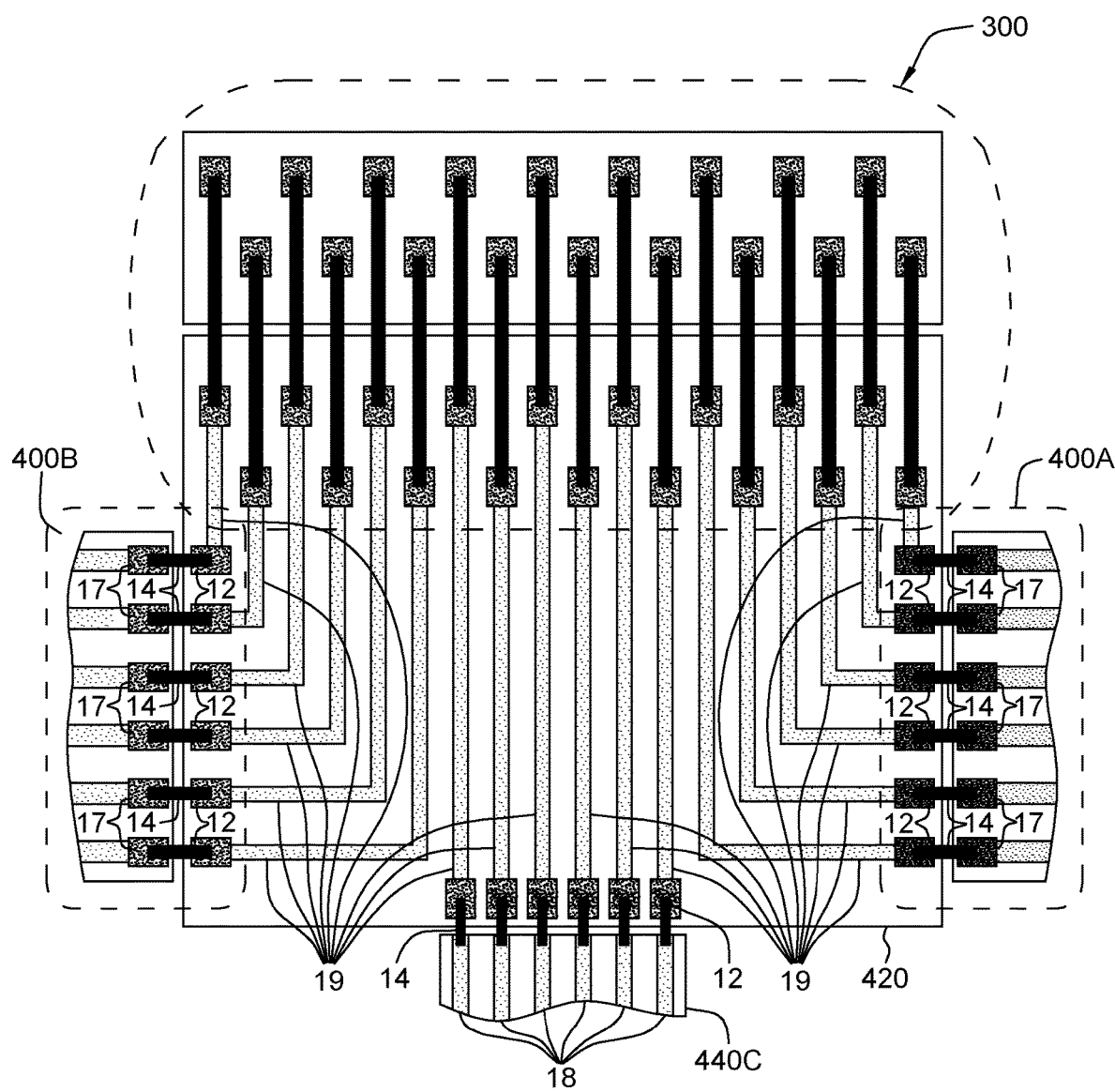
FIG. 4 depicts a top view of a third electronic device assembly with the electronic device connecting to the top portion of the interconnect die, the right side of the interconnect die connected to the first flex cable, the left side of the interconnect die connected to the second flex cable, and a bottom center portion of the interconnect die connected to a third flex cable, in accordance with an embodiment of the present invention.

FIG. 4 depicts the top view of a third tape head assembly with section 300, section 400A, section 400B, and a bottom center portion of interconnect die 420 connecting by wirebonds 14 to flex cable 440C, in accordance with an embodiment of the present invention. The third tape head assembly was previously identified as the third electronic device assembly in the brief description of the drawings. Section 300 includes the elements associated with connections to tape head 100 as discussed in detail previously in FIG. 2. Sections 400A and 400B include the elements associated with connection to flex cable 340A and flex cable 340B discussed in detail with respect to FIG. 3.

As depicted, FIG. 4 includes interconnect pads 12 on interconnect die 420, lines 19 on interconnect die 420, wirebonds 14 connecting interconnect pads 12 to flex cable 440C, section 300, section 400A, and section 400B. The third tape head assembly provides connections to four sides of interconnect die 120. Not depicted in FIG. 4 are interconnect pads on flex cable 440C, in an embodiment, wirebonds 14 are joined to lines 18 on flex cable 440C. In some embodiments, interconnect pads (not depicted) are included on flex cable 440C for one of wirebonding, solder connections, conductive adhesive connections, or anisotrophic conductive film connections.

Using three sides of interconnect die 420 to escape connections, such as wirebonds 13 in section 300, from tape head 100 to three flex cables allows designers tradeoffs in the tape assembly head in terms of a size and shape of flex cables and interconnect die 420. A size and complexity of flex cable 440C, of flex cables 340A and 340B (in section 400A and 400B from FIG. 3), and a size and shape of interconnect die 420 can be changed depending on a number of interconnect pads 12 on each of the three sides of interconnect die 420. For example, flex cable 440C may only require 43 of lines 18 and 43 interconnect pads 17 (not depicted) for 43 wirebonds 14 when a total of 129 wirebonds (e.g., 129 of wirebonds 13) connect to tape head 100 and when each of the three flex cables have a same number of connections (e.g., 129 connections to the tape head divided to escape equally to three flex cables). When this occurs, it is possible that interconnect die 420 with interconnect pads 12 on three sides can be much smaller than interconnect die 120 in FIG. 2. Alternatively, using three sides of interconnect die 420 when interconnect die 420 has a larger interconnect die size can allow interconnect pads 12 to be further apart allowing for less dense connections to flex cables 440C, 340A and 340B (e.g., larger interconnect pad sizes and bigger line sizes/spaces in the flex cables for less complex flex cables to reduce cost and/or to improve assembly yield). An ability to connect to one or more flex cables, such as, flex cables 440C, 340A, and 340B in FIGS. 3 and 4, or flex cable 140 in FIG. 2, provides design options for a storage system designer (e.g., different space/size requirements, different flex configurations, cost tradeoffs, etc.). In some embodiments, the connections formed by wirebonds 14 to one or more of flex cables 440C, 340A and 340B are replaced with electrical connections made with one or anisotrophic conductive film, solder, or a conductive adhesive.

Figure 5A:
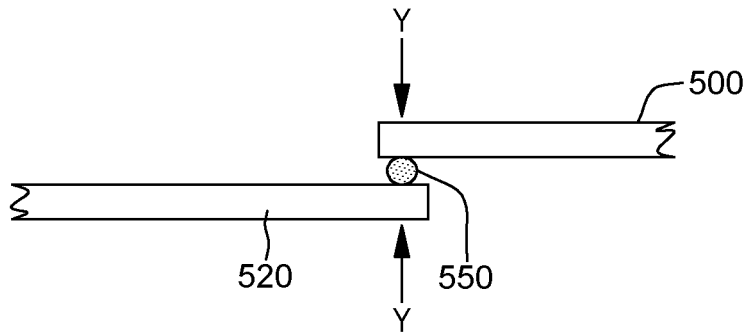
FIG. 5A depicts a cross-section of a portion of an electronic device connecting to a portion of the interposer die using a solder ball, in accordance with an embodiment of the present invention.

FIG. 5A depicts a cross-section of the portion of tape head 500 when tape head 500 connects to interconnect die 520 using solder connection 550, in accordance with an embodiment of the present invention. While depicted with tape head 500 over interconnect die 520, interconnect die 520 and tape head 500 can be in any orientation (e.g., interconnect die 520 can be over tape head 500 or both of interconnect die 520 and tape head 500 can be rotated 90 degrees to provide a vertical orientation). As depicted, FIG. 5A includes a portion of tape head 500, solder connection 550, and a portion of interconnection die 520. Instead of connecting tape head 500 to interconnect die 520 with wirebonds 13 as depicted in FIG. 2, tape head 500 connects to interconnect die 520 using solder. For example, solder connection 550 is one of a plurality of solder connections between tape head 500 and interconnect die 520 that can be formed using reflowed solder balls or deposited solder, such as, solder paste or an evaporated solder deposited on interconnect die 520 (e.g., a controlled collapse chip connection or C4). In various embodiments, solder connection 550 is adjacent to edges of interconnect die 520 and tape head 500. Solder balls and/or deposited solder can be reflowed to attach tape head 500 to interconnect die 520 using known processes and methods. In one embodiment, a conductive adhesive paste is used to make the connection provided by solder connection 550.

Figure 5B:
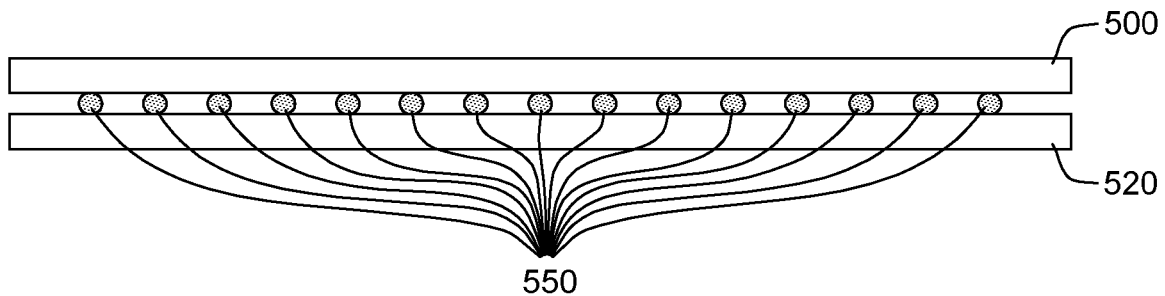
FIG. 5B depicts a cross-section parallel to an edge of the electronic device along section Y-Y of FIG. 5A that uses solder ball connects, in accordance with an embodiment of the present invention.

FIG. 5B depicts a cross-section parallel to an edge of tape head 500 along section Y-Y of FIG. 5, in accordance with an embodiment of the present invention. As depicted, FIG. 5B includes a plurality of solder connections 550 between interconnect die 520 and tape head 500 that are parallel to and adjacent to an edge of interconnect die 520. FIG. 5B illustrates a second method of joining the required connections (e.g., channels) from tape head 500 to interconnect die 520 using the plurality of solder connections 550 between tape head 500 and interconnect die 520.

Figure 5C:
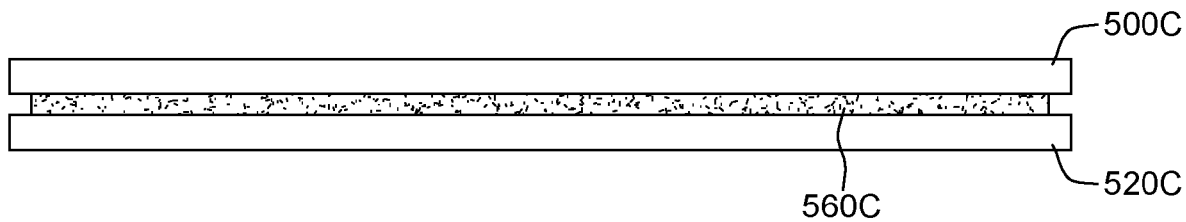
FIG. 5C depicts a cross-section parallel to an edge of the electronic device along section Y-Y of FIG. 5A using an anisotrophic conductive film for a connection between the electronic device and the interconnect die, in accordance with an embodiment of the present invention.

FIG. 5C depicts a cross-section along section Y-Y of FIG. 5A using anisotrophic conductive film (ACF) 560C for connections to interconnect die 520C from tape head 500, in accordance with an embodiment of the present invention. As depicted, FIG. 5C depicts a third method of connecting tape head 500C to interconnect die 520C using ACF 560C where conductive particles or wires within ACF 560C provide an electrical connection between a plurality of interconnect pads (not depicted) on tape head 500C and a plurality of interconnect pads (not depicted) on interconnect die 520C. In various embodiments, a size and shape of the plurality of interconnect pads (not depicted) on interconnect die 520C and a size and shape of the plurality of interconnect pads (not depicted) on tape head 500C is a size of interconnect pads used with an anisotrophic conductive film. In one embodiment, the size and shape of the interconnect pads on tape head 500C and interconnect die 520C are the same size as the interconnect pads on tape head 500 and interconnect die 520.

Figure 5D:
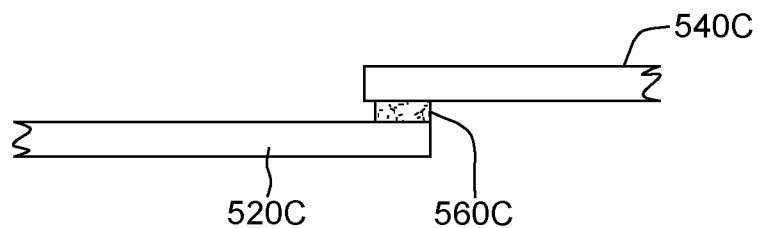
FIG. 5D depicts a cross-section of the interconnect die that is through an anisotrophic conductive film connecting interconnect pads on the interconnect die to interconnect pads on the flex cable, in accordance with an embodiment of the present invention.

FIG. 5D depicts a cross-section parallel to a top edge of interconnect die 520C and parallel to an edge of flex cable 540C using ACF 560C, in accordance with an embodiment of the present invention. As depicted, FIG. 5D depicts a third method of connecting interconnect die 520C to flex cable 540C using ACF 560C where conductive particles within ACF 560C provide an electrical connection between a plurality of interconnect pads (not depicted) on interconnect die 520C and a plurality of interconnect pads (not depicted) on flex cable 540C. In various embodiments, connections to any side of interconnect die 520C to one or more of flex cable 540C are made using ACF 560C. For example, while only one flex cable 540C is depicted in FIG. 5C, three of flex cable 540C can be electrically connected to three sides of interconnect die 520C using three portions of ACF 560C (e.g., similar to FIG. 4 but, with wirebonds 14 replaced with ACF 560C and each of the three edges of interconnect die 520C). As depicted in FIG. 5D, flex cable 540C overlaps the edge of interconnect die 520C.

In an embodiment, each of the four sides of interconnect die 520C are each connected to one of flex cable 540C or tape head 500C using AFC 560C as depicted in FIGS. 5C and 5D, respectively. In some embodiments, a combination of one or more of wirebonds (depicted in FIG. 2), solder connections (depicted in FIG. 5A), and electrical connections using an anisotrophic film (depicted in FIGS. 5C and 5D) are made to interconnect die 520C. For example, interconnect die 520C may be connected to tape head 500C using solder (not depicted) and connected to flex cable 540C by ACF 560C. In one embodiment, one of a conductive adhesive paste or solder is used to make the connection provided by ACF 560C. For example, a conductive adhesive paste with silver or copper fill can be selectively screened over interconnect pads 12 to form connections between interconnect die 520C and flex cable 540C.

Figure 6:
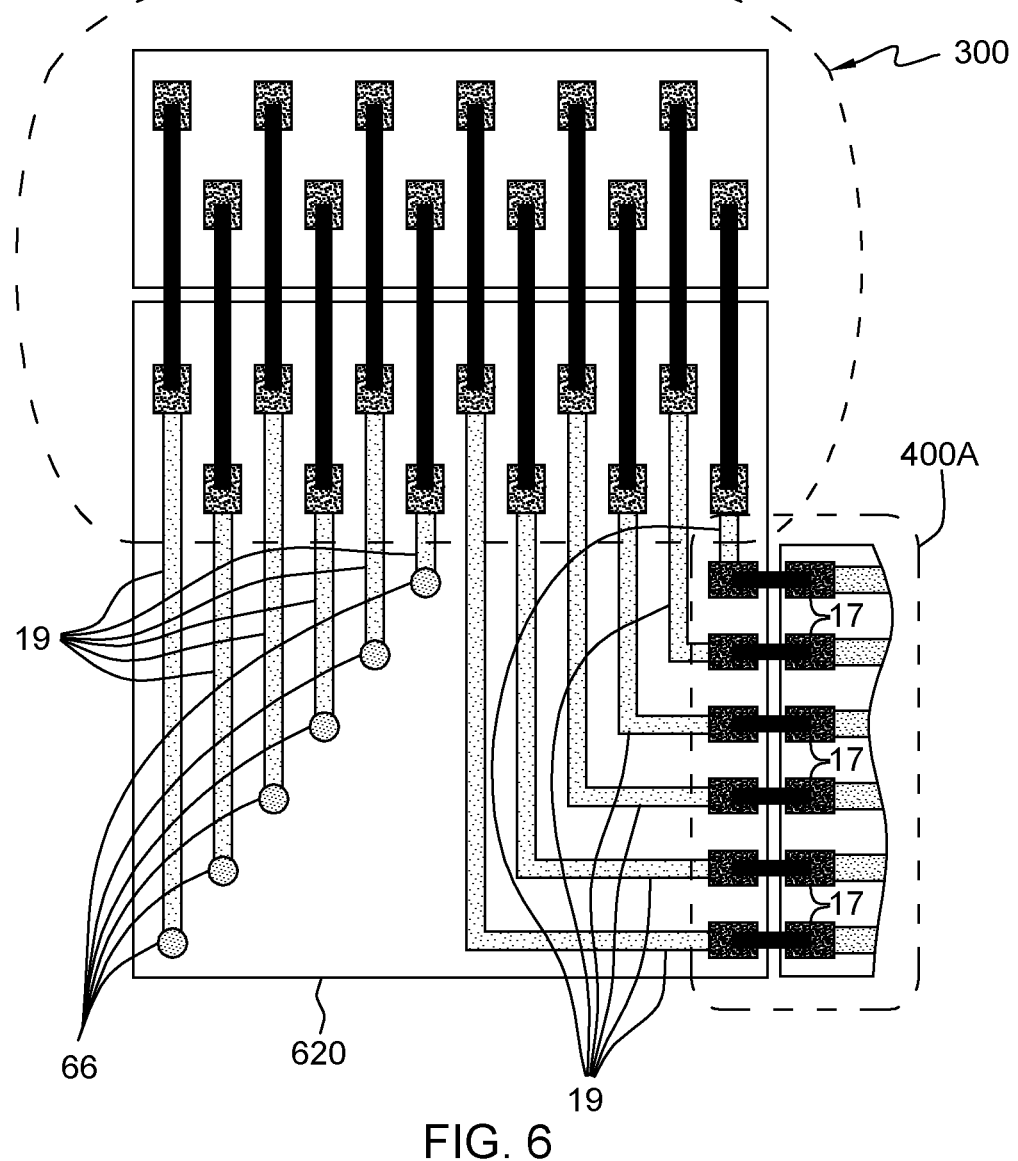
FIG. 6 depicts a top view of a fourth electronic device assembly with an interconnect die with a plurality of through silicon vias, the electronic device connecting to the interconnect die, and the right top side of the interconnect die connecting to a top flex cable, in accordance with an embodiment of the present invention.

FIG. 6 depicts a top view of the fourth tape head assembly including interconnect die 620 with through silicon vias (TSVs) 66, in accordance with an embodiment of the present invention. The fourth tape head assembly was previously identified as the fourth electronic device assembly in the brief description of the drawings. As depicted, FIG. 6 includes section 300 illustrating the elements discussed in detail with respect to FIG. 2, section 400A illustrating the elements discussed in detail with respect to FIG. 3, lines 19 on interconnect die 620, and TSVs 66.

In FIG. 6, some of lines 19 may go from a portion of the interconnect pads (e. g., interconnect pads 16 in FIG. 2) on the top edge of interconnect die 620 to TSVs 66. A remaining portion of lines 19 may go from the remaining portion of the interconnect pads on the top edge of interconnect die 620 to interconnect pads (e.g., interconnect pads 12 on FIG. 2) on a side of interconnect die 120. In various embodiments, a number of wirebonds in section 400A between interconnect die 620 and the flex cable in section 400A is equal to the number of wirebonds in section 300 minus the number of TSVs 66 in interconnect die 620.

While FIG. 6, depicts interconnect die 620 with six TSVs 66, any number of TSVs 66 can be present in interconnect die 620. For example, a number of TSVs 66 can change depending on a number of connections to the tape head, a number of channels in the tape head, a number of connections desired to a flex cable in section 400A, a number of connections to a flex cable connected to a backside of interconnect die 620 (depicted in FIG. 7) and a size of interconnect die 620.

TSVs 66 can be formed using known TSV formation processes. For example, TSVs 66 may be created by etching vias from a top surface on interconnect die 120 through interconnect die 120 to a bottom surface of interconnect die 120. An anisotropic wet etch process may be used to form the vias, however, any suitable etch process, such as a reactive ion etch, may be used to form vias through interconnect die 120. In various embodiments, TSVs 66 via size ranges from less than 10 um to 300 um. For example, TSVs 66 can be 30 um in diameter. TSVs 66 can be filled with a metal, such as tungsten or copper, using conventional semiconductor TSV fill processes.

Figure 7:
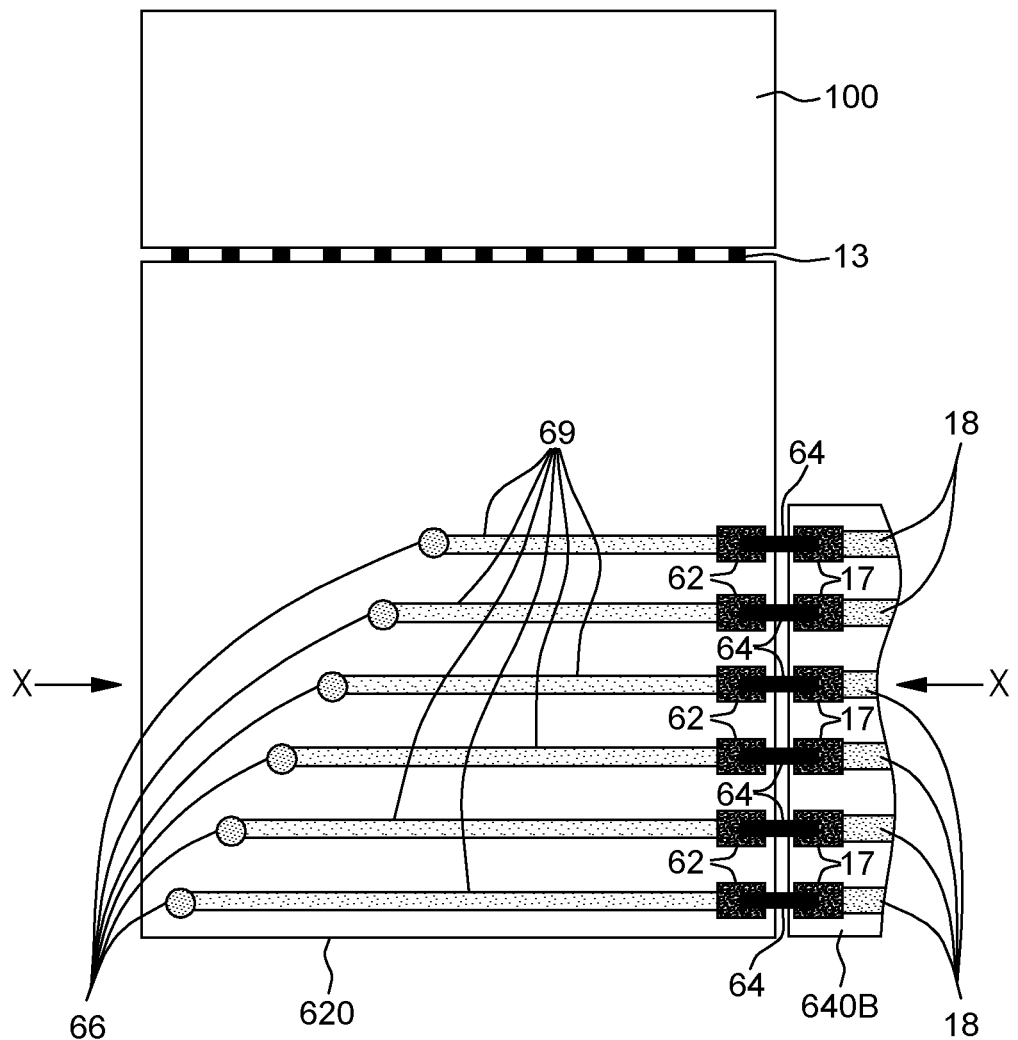
FIG. 7 depicts a bottom view of the fourth electronic device assembly with through silicon vias connecting with a bottom right edge of the interconnect die, in accordance with an embodiment of the present invention.

FIG. 7 depicts a bottom view of the fourth tape head assembly with a bottom of interconnect die 620 with TSVs 66 connecting to a bottom flex cable 640B by wirebonds 64, in accordance with an embodiment of the present invention. As depicted, FIG. 7 includes interconnect die 620 with TSVs 66, lines 69, interconnect pads 62, wirebonds 64, interconnect pads 17, and flex cable 640B with lines 18. In various embodiments, flex cable 640B connects by wirebonds 64 to interconnect pads 62 on the bottom surface of interconnect die 620. In some embodiments, flex cable 640B connects to interconnect die 620 using one of a conductive adhesive, an anisotrophic conductive film, or with solder.

FIG. 7 also includes bottom view of tape head 100 and a partial view of wirebonds 13 on the topside of tape head 100 connecting to the top side of interconnect die 620 (e.g., a partial view of wirebonds 13 is seen between the bottom of interconnect die 620 and the tape head 100). As previously discussed with respect to FIG. 6, a number of TSVs 66 is not limited to six TSVs but can be any number of TSVs 66 depending a number of wirebond connections required, a size of interconnect die 620 and a size of one or more of flex cables 640B.

In some embodiments, flex cable 640B is under a flex cable connected to the topside of interconnect die 620 (e.g., under flex cable 340A in FIG. 3). In other embodiments, flex cable 640B connects to a different side of interconnect die 620 than the side of interconnect die 620 connecting to the flex cable on the top side of interconnect die 620. For example, flex cable 640B connects to the right side or bottom of interconnect die 620. In various embodiments, the number of interconnect pads 62 and the number of wirebonds 64 are each equal to a number of TSVs 66.

Figure 8A:
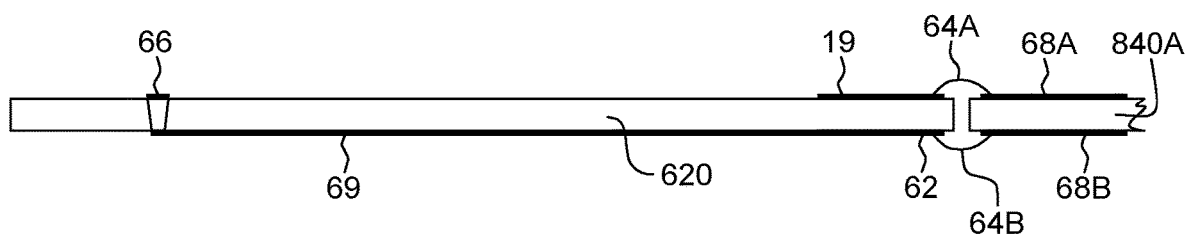
FIG. 8A depicts a cross-section through section X-X on FIG. 7 when a two-sided flex cable is connected to the interconnect die with through silicon vias, in accordance with an embodiment of the present invention.

FIG. 8A depicts a cross-section through section X-X on FIG. 7 when a two-sided flex cable 840A replaces a top flex cable and a bottom flex cable, in accordance with an embodiment of the present invention. As depicted, FIG. 8A includes two-sided flex cable 840A with lines 68A on a top side and lines 68B on a bottom side of two-sided flex cable 840A, lines 19 on a topside of interconnect die 620, wirebonds 14, lines 69 on a bottom side of interconnect die 620, interconnect pads 62, wirebonds 64A, wirebonds 64B, and TSVs 66. Wirebonds 64B connect from a bottom surface of interconnect die 620 to lines 68B on two-sided flex cable 840A. In various embodiments, a number of wirebonds 64B is equal to the number of TSVs 66. In some embodiments, wirebonds 64B connect interconnect pads 62 on the bottom side of interconnect die 620 to interconnect pads (not depicted) on a bottom surface of the two-sided flex cable 840A.

Wirebonds 64A connect interconnect die 620 with interconnect pads, such as interconnect pads 12 (not depicted), on the top surface of interconnect die 620 to lines 68A and/or interconnect pads (not depicted) on a top surface of two-sided flex cable 840A. In various embodiments, the number of wirebonds 64A is equal to a number of connections to the tape head (e.g., tape head 100 in FIG. 2A) minus the number of TSVs 66 in interconnect die 620. Lines 19 can connect a portion of connections to the tape head (not depicted) to wirebonds 64A. In an embodiment, the connections and elements of FIG. 8A are essentially the same as the connections and elements of FIG. 7 with the exception of using two-sided flex cable 840A instead of a one-sided flex cable 640B in FIG. 7.

As depicted, two-sided flex cable 840A can be wirebonded on both sides to interconnect die 620 instead of using two flex cables as depicted in FIGS. 6 and 7. In various embodiments, two-sided flex cable 840A has a top and a bottom metal layer separated by at least one dielectric layer. For example, two-sided flex cable 840A has two metallized layers of a dielectric film laminated with an adhesive layer or two-sided flex cable 840A can be a single layer of a dielectric film with metallization on both sides of the dielectric film (e.g., no adhesive). In another example, two-sided flex cable 840A includes a third metal layer, such as a power plane or ground plane, separated from the top metal layer and the bottom metal layer by another dielectric material layer.

Figure 8B:
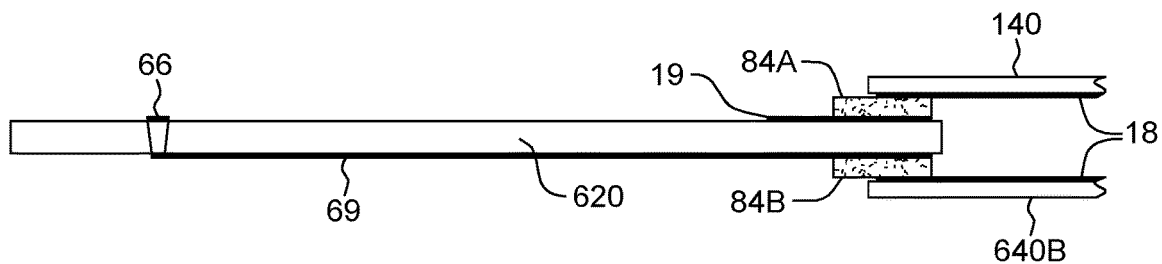
FIG. 8B depicts a cross-section through section X-X on FIG. 7 when the interconnect die with through silicon vias connects to two one-sided flex cables using an anisotrophic conductive film, in accordance with an embodiment of the present invention.

FIG. 8B depicts a cross-section through section X-X on FIG. 7 using a second method of connecting two flex cables to interconnect die 620, in accordance with an embodiment of the present invention. As depicted, FIG. 8B includes interconnect die 620 with line 19 on the top surface of interconnect die 620 electrically connecting a number of interconnect pads (not depicted) on the top surface of the interconnect die 620 to a number of interconnect pads (not depicted) in flex cable 140 of FIG. 8B. Anisotrophic conductive film (ACF) 84A connects lines 19 and interconnect pads (not depicted) to lines 18 and interconnect pads (not depicted) on flex cable 140 parallel to an edge of interconnect die 620. Anisotrophic conductive film (ACF) 84B connects lines 69 and/or interconnect pads (not depicted) on the bottom of interconnect die 620 to lines 18 and/or interconnect pads (not depicted) on a top surface of flex cable 640B.

A number of connections formed using ACF 84B is equal to a number of TSVs 66. A number of connections formed using ACF 84A equals a number of interconnect pads on the tape head, such as a number of interconnect pads 11 on tape head 100 in FIG. 2, minus the number of TSVs 66 in interconnect die 620. While flex cable 140 is depicted over flex cable 640B in FIG. 8B and both flex cable 140 and flex cable 640B are on one side of interconnect die 620, in some embodiments, flex cable 140 connects to interconnect pads 12 on one side of interconnect die 620 and flex cable 640B connects to interconnect pads 62 on another side of interconnect die 620 (e.g., flex cable 140 is not over flex cable 640B). In an embodiment, ACF 84A and 84B connections are replaced with a conductive adhesive paste.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. An electronic device assembly, comprising:
    a plurality of interconnect pads on an electronic device;
    a first set of interconnect pads on an interconnect die adjacent to a first edge of the interconnect die;
    a first set of connections between the plurality of interconnect pads on the electronic device and the first set of interconnect pads on the interconnect die adjacent to the first edge of the interconnect die;
    a second set of interconnect pads adjacent to a second edge of the interconnect die, wherein the second set of interconnect pads connect to a first portion of the plurality interconnect pads on the electronic device;
    a second set of connections between the second set of interconnect pads adjacent to the second edge of the interconnect die and a set of interconnect pads on a first flex cable;
    a third set of interconnect pads adjacent to a third edge of the interconnect die, wherein the third set of interconnect pads connect to a second portion of the plurality interconnect pads on the electronic device;
    a third second set of connections between the third set of interconnect pads adjacent to the third edge of the interconnect die and a set of interconnect pads on a second flex cable.

2. The electronic device assembly of claim 1, wherein a number of interconnect pads of the plurality of interconnect pads on the electronic device is a same number of interconnect pads of the first set of interconnect pads adjacent to the first edge of the interconnect die.

3. The electronic device assembly of claim 1, wherein a number of interconnect pads of the plurality of interconnect pads on the electronic device is more than a number of interconnect pads of the second set of interconnect pads adjacent to a first side of the interconnect die the interconnect die.

4. The electronic device assembly of claim 1, wherein a number of interconnect pads of the second set of interconnect pads on the interconnect die adjacent to the second edge of the interconnect die and a number of interconnect pads of the third set of interconnect pads adjacent to the third edge of the interconnect die equals a number of the plurality of interconnect pads on the electronic device.

5. The electronic device assembly of claim 4, wherein the number of interconnect pads of the second set of interconnect pads adjacent to the second edge of the interconnect die is a different number than the number of interconnect pads of the third set of interconnect pads adjacent to the third edge of the interconnect die.

6. The electronic device assembly of claim 1, wherein the first set of connections, the second set of connections, and the third set of connections are each a different type of connection, and wherein the different type of connections are one of wirebond connections, solder connections, and anisotrophic conductive film connections.

7. An electronic device assembly, comprising:
    a plurality of interconnect pads on an electronic device;
    an interconnect die with a first set of interconnect pads on a top surface of the interconnect die adjacent to an edge of a first side of the interconnect die connecting to the plurality of interconnect pads on the electronic device, a second set of interconnect pads on the top surface of the interconnect die adjacent to an edge of a second side of the interconnect die, and a third set of interconnect pads on a bottom surface of the interconnect die adjacent to an edge of a third side of the interconnect die, wherein the third set of interconnect pads connect to a number of through silicon vias in the interconnect die;

a top side of a two-sided flex cable connecting to the second set of interconnect pads on the top surface of the interconnect die adjacent to the edge of the second side of the interconnect die; and a bottom side of the two-sided flex cable connecting to the third set of interconnect pads on the bottom surface of the interconnect die adjacent to the edge of the third side of the interconnect die.

8. The electronic device assembly of claim 7, wherein a first portion of the first set of interconnect pads on the top surface of the interconnect die connects to each through silicon via of the number of through silicon vias in the interconnect die.

9. The electronic device assembly of claim 7, wherein a number of the third set of interconnect pads on the bottom surface of the interconnect die is equal to the number of through silicon vias in the interconnect die.

\* \* \* \* \*